Jan. 24, 1956
D. P. RYAN
2,731,843
POWER TRANSMISSION DEVICE
Filed April 9, 1953
3 Sheets-Sheet 1
FIG. 1
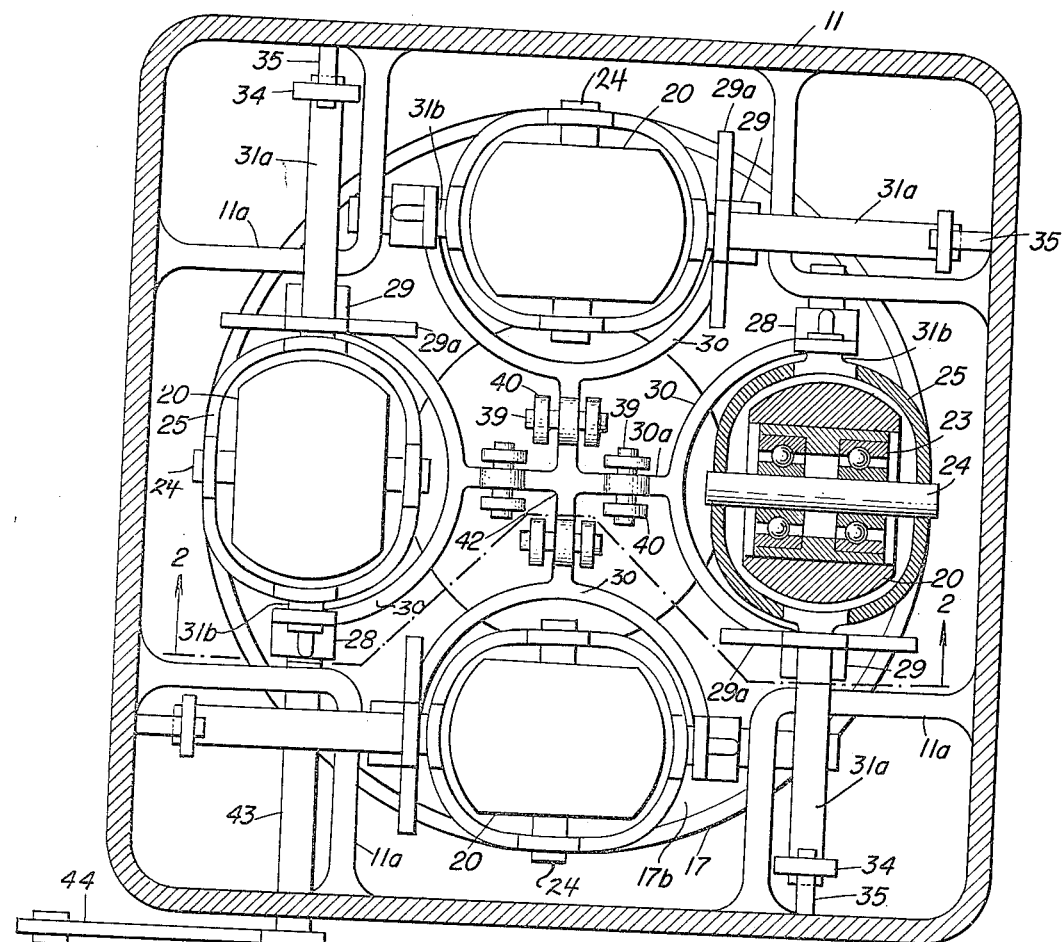
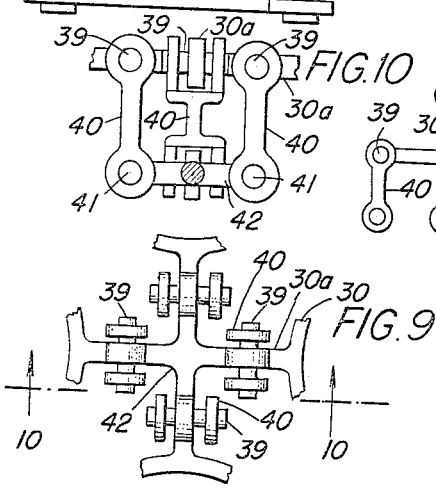
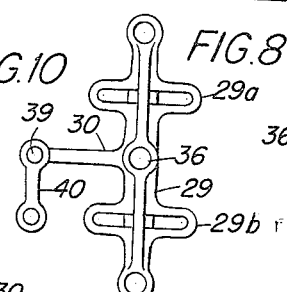
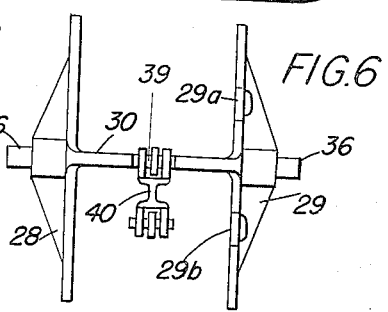
Inventor.
Donald P. Ryan
By
Pennie Edmonds Morton Barrows Taylor
Attorneys INVENTOR.
Donald P. Ryan
Attorneys

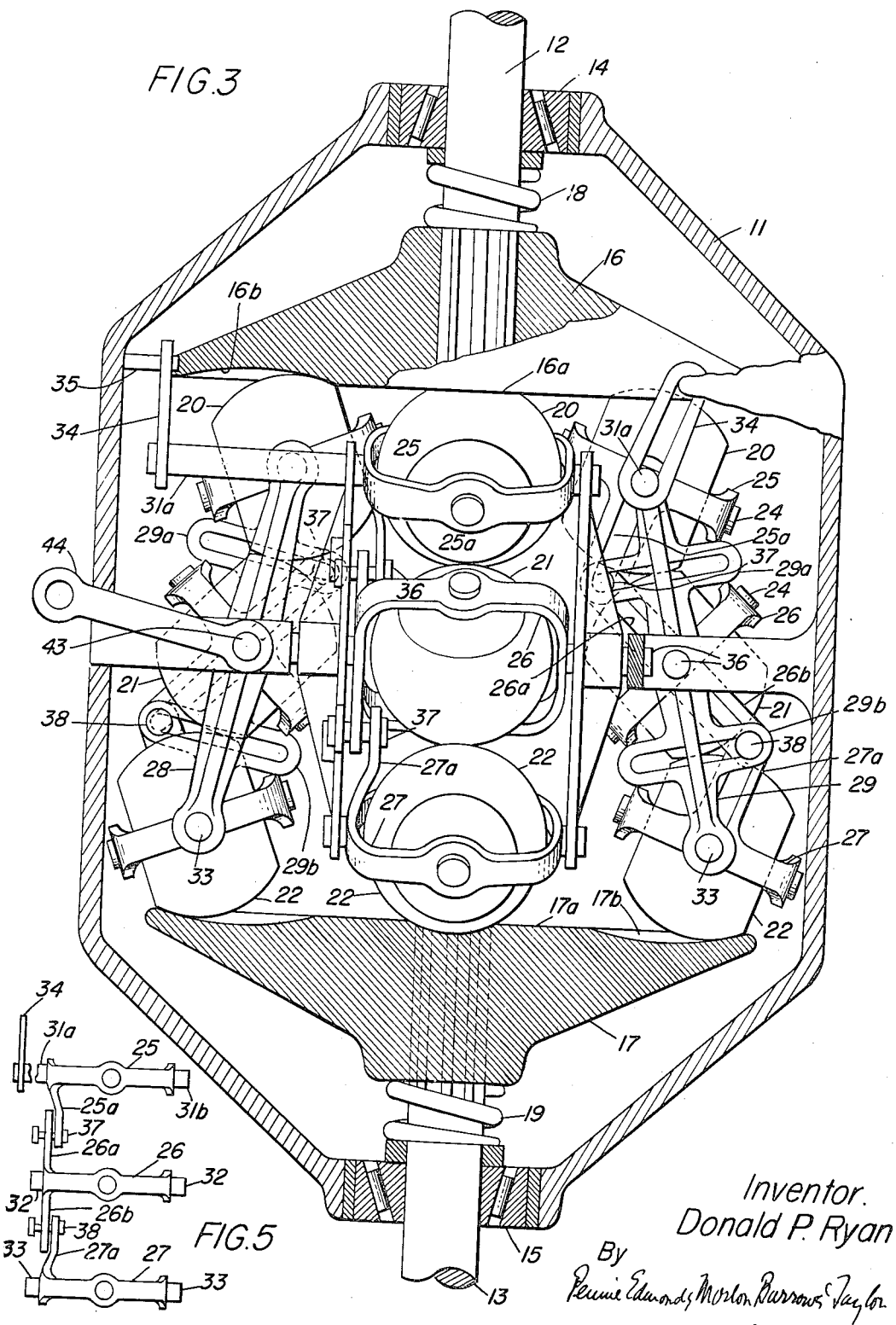

United States Patent Office 2,731,843
Patented Jan. 24, 1956

2,731,843
POWER TRANSMISSION DEVICE

Donald P. Ryan, Montreal, Quebec, Canada

Application April 9, 1953, Serial No. 347,654

9 Claims. (Cl. 74—200)

This invention relates to power transmission devices, which comprise driving and driven members and a frictional connection between them capable of adjustment to vary the effective radii of the members and thus the ratio of input to output torque. More particularly, the invention is concerned with a novel power transmission device of the type referred to, which can be operated to effect a gradual variation in the torque ratio under varying load without altering the relative positions of the driving and driven members, changing the efficiency of the device, or subjecting any of the parts of the device to wear resulting from translation.

This device of the invention comprises a driving member and a driven member mounted for coaxial rotation and one or more epicyclic trains of rollers having peripheral faces of transverse spherical curvature mounted between the opposed operating faces of the members. Each train comprises an odd plurality of rollers arranged with their axes of rotation in a plane with the common axis of the driving and driven members and the rollers at one end of the trains frictionally engage the operating surface of the driving member and are rotated thereby. The rotation of these rollers is transmitted through intermediate rollers in the trains to the rollers at the other end of the trains, which engage the surface of the driven member and cause it to rotate.

The rollers in each train are mounted for rocking movement about axes normal to their axes of rotation and variation in the ratio of input torque to output torque is effected by rocking the rollers in each train simultaneously with the odd and even rollers rocking in opposite directions. As a result of such rocking movement, the end rollers in the train engage the driving and driven members at different radial distances from their common axis and the effective radii of the members are thus varied. The translation of the rollers, which is necessary to effect a variation in torque ratio, is accomplished in the new device without sliding friction. The rollers remain in engagement with each other and with the driving and driven members at all times, and the torque ratio may be varied smoothly and gradually, while power is being transmitted from one member to the other.

In a device, in which a plurality of roller trains are used, the trains are connected together in such manner that, when the rollers of one train are rocked, the rollers of all the other trains are similarly rocked. The number of trains of rollers employed in the device depends on the power to be transmitted and the frictional properties of the rollers. Although a single train might suffice, the device would be unbalanced, and, therefore, a minimum of two trains is normally used.

For a better understanding of the invention, reference is made to the drawings, in which Fig. 1 is a diagrammatic top plan view of one form of the new device, with the driving element removed and parts shown in section;

Fig. 3 is a diagrammatic elevational view of the device with parts shown in section and with the rollers arranged for an input-to-output torque ratio other than unity;

Figs. 4 and 5 are front and side elevational views, respectively, of the supports for the rollers in each train;

Fig. 6 is a side elevational view of a pair of train arms and a link associated therewith;

Figs. 7 and 8 are side elevational views of the train arms of Fig. 6 viewed from the left and right, respectively, of Fig. 6;

Fig. 9 is a plan view of the link, which interconnects the trains; and

Fig. 10 is a sectional view on line 10—10 of Fig. 9.

Figure 2:
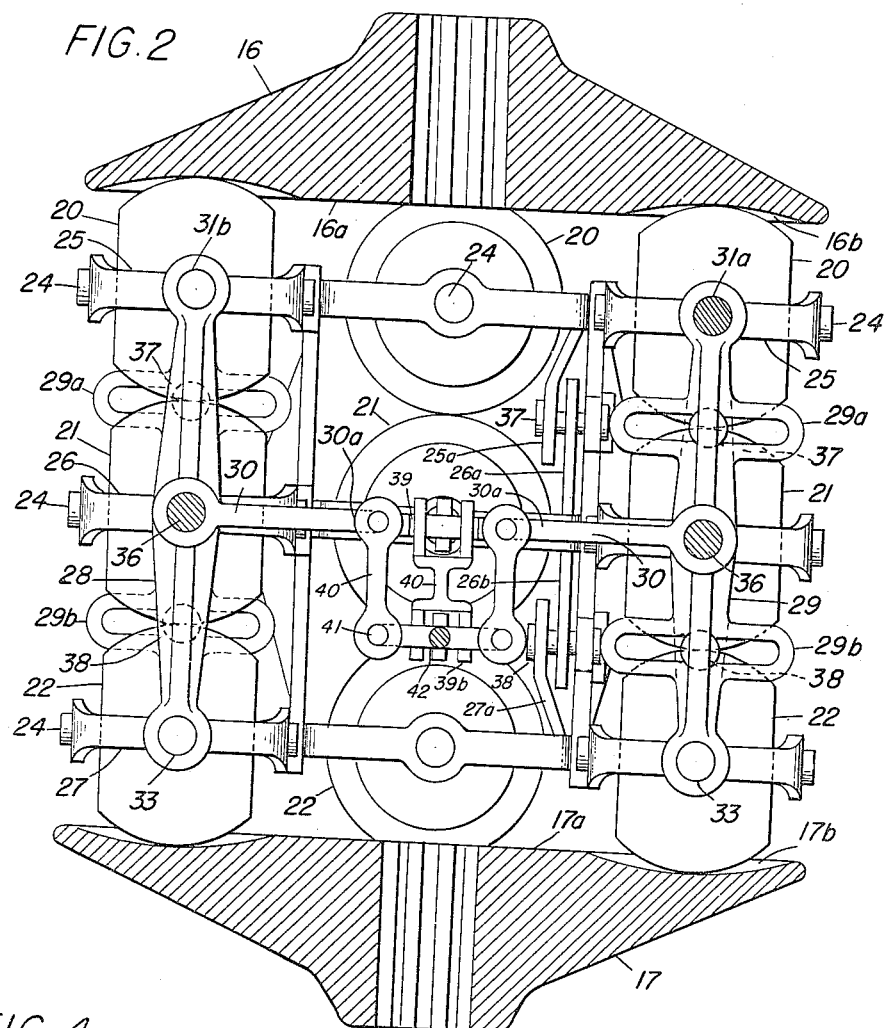
Fig. 2 is a sectional view on line 2—2 of Fig. 1 with parts omitted.
Figure 4:
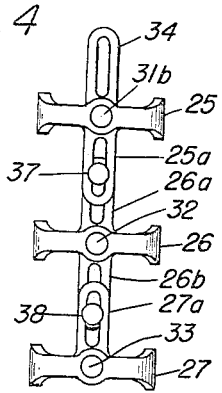
Figure 7:
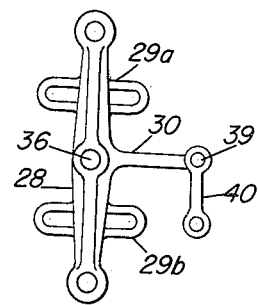

The form of the new device shown in the drawings includes a housing 11, in which axially aligned shafts 12, 13 are mounted in bearings 14, 15, respectively. A driving member 16 of disc form is splined on shaft 12, and a like driven member 17 is similarly mounted on shaft 13. The members 16, 17 have opposed faces 16a, 17a, respectively, with operating surfaces in the form of shallow circular grooves 16b, 17b of circular transverse curvature near their peripheries. A coil spring 18 surrounding the shaft 12 bears at one end against the inner race of bearing 14 and at the other end against driving member 16 and urges the member 16 inwardly toward member 17. Another coil spring 19, surrounding the shaft 13, similarly bears against the bearing 15 and the driven member 17 and urges member 17 inwardly.

Power is transmitted from the driving member to the driven member by one or more epicyclic trains of an odd plurality of similar rollers and the rollers in each train have contacting peripheral friction faces of transverse spherical curvature and are arranged with their axes of rotation in a plane with the common axis of the driving and driven members. In the construction shown, there are four similar trains, equiangularly spaced about and concentric with the axis of the driving and driven member, and each train consists of three rollers 20, 21, 22. Only one of the trains will be described in detail, but the description applies to all.

The three rollers 20, 21, 22 are so mounted that roller 20 frictionally engages the operating surface 16b of the driving member 16, roller 22 similarly engages the operating surface 17b of the driven member 17, and the intermediate roller 21 engages both rollers 20 and 22. Each roller is mounted for rotation on bearings 23 on a shaft 24 (Fig. 1), and yokes 25, 26, 27 encircle the rollers 20, 21, 22, respectively, and retain the shafts 24. Each yoke has a pair of pivot pins lying on an axis normal to the shaft 24 of the roller in the yoke, and the pivot pins are received in sockets in a pair of train arms 28, 29 lying on opposite sides of the train and connected by a semi-circular bar 30. Yoke 25 carries a long pivot pin 31a and a short pivot pin 31b (Fig. 1), and yokes 26, 27 have short pivot pins 32, 33. The long pivot pin 31a on the yoke 25 extends through the train arm 29 and has a slotted guide 34, which is secured to its outer end and slides on a pin 35 fixed to the housing. The train arms 28, 29 carry pivot pins 36, located coaxially with the openings in the arms, which receive pins 32 on the center yoke 26, and retained for rotation in openings in ribs 11a. The ribs are of L-shape and are secured to adjacent walls of the housing at the several corners thereof in a plane midway between the driving and driven members.

The yokes 25, 26, and 27 are connected together for relative rocking movement and, for this purpose, yoke 25 has a downwardly extending slotted arm 25a connected by a pin 37 to an upwardly extending slotted arm 26a on yoke 26. Yoke 26 also has a downwardly extending slotted arm 26b connected by a pin 38 to an upwardly extending slotted arm 27a on yoke 27. The pin 37 enters a guide slot 29a on train arm 29 and pin 38 enters a guide slot 29b on arm 29.

The supports for the rollers of the trains are interconnected for simultaneous movement, so that rocking of the supports of the rollers of one train causes a like movement of the supports of the rollers of the other trains. For this purpose, the bar 30 of each pair of train arms has an arm 30a connected by a pin 39 to the upper end of a link 40. The lower ends of the links 40 are connected by pins 41 to respective arms of a cross 42. The rocking of the roller supports is effected by the rocking of shaft 43, which is an extension of the pivot of one of the train arms 28, which projects out of the housing 11. A lever 44 secured to the exposed end of shaft 43 serves as a means for operating the device.

For an input-to-output torque ratio of unity, the parts of the device are positioned as shown in Figs. 1 and 2. The train arms 28 and 29 lie parallel to the common axis of the driving member 16 and the driven member 17 and the axes of rotation of corresponding rollers in the several trains lie in planes transverse to that common axis.

In order to change the speed and torque ratio of the device, the effective radii of the driving and driven members are varied by rotating the trains of rollers about the axes of rotation of the supports for the central rollers in the trains. As the trains are thus rotated, the supports of each train are rocked about axes transverse to the axes of rotation of the rollers.

The input-to-output torque ratio may be varied in either direction from unity, and when the ratio is greater than unity the elements are positioned as shown in Fig. 3. The change from a ratio of unity to a ratio greater than unity is initiated by moving the lever 44 to rotate the control shaft 43 in a clockwise direction. Rotation of the control shaft causes the train to rotate clockwise about the axis of the pivot pins 36. The arm 30a on the bar 30 of the train arms moves downward and carries with it the cross 42 and the arms 30a on the bars of the train arms of all the other trains. As a result, all the trains are rotated by the same amount and in the same direction with respect to the axis of the driving and driven members.

As the trains rotate about their axes through the pivot pins 36, the yokes 25, 26, 27 in each train rock about their axes in the following manner. As the upper yoke 25 is moved inwardly toward the common axis of the driving and driven members by the train arms 28, 29, the guide 34 is caused to swing on stationary pin 35 and, since the guide is rigid with pivot pin 31a of yoke 25, yoke 25 is caused to rock in the opposite direction from that of the rotation of the train arms. As the yoke 25 rocks, its guide 25a swings inwardly, and swings the guide 26a on the center yoke 26 inwardly. Yoke 26 is thus rocked in the same direction as the train arms but through a greater angle and the connection between guide 26b on yoke 26 and guide 27a on yoke 27 causes yoke 27 to be rocked in the same direction as yoke 25 and in the opposite direction from yoke 26. The yokes for the odd and even numbered rollers in a train are thus rocked in opposite directions and the rollers are rolled transversely on one another and on the surfaces of the driving and driven members.

A change in speed ratio from unity or greater than unity to a ratio less than unity is brought about by movements of the trains opposite to those described. Accordingly, the trains are rotated to move the rollers 20 outwardly and rollers 22 inwardly with respect to the common axis of the driving and driven members. Also, the yokes 25, 26, 27 are rocked in a manner such that the engaging faces of the rollers in each train roll transversely on one another and on the operating surfaces of the driving and driven members.

The train arms 28, 29 are symmetrical about the axes of pins 36 and the rollers operated by the train arms are of the same size. When the operating surfaces 16b and 17b on the driving and driven members are in contact with the rollers in the trains, the centers of curvature of the arcs forming the intersections of those surfaces with a radial plane through the common axis of the driving and driven members and the axes of rotation of the rollers in the train coincide and lie in the axis of the pins 36 of the train. Accordingly, rotation of the train arms about the axes of pins 36 does not change the distance between the driving and driven members and the only axial movement of the members occurs as a result of wear on the friction surfaces on the rollers. Such wear is taken up by the springs 18, 19 urging the driving and driven members toward each other.

In the above description, the members 16 and 17 have been referred to as the driving and driven members, respectively, but it will be apparent that power may be transmitted through the device in either direction. The train arms described provide a convenient manner for rotating the trains to vary the ratio of input to output torque, but any other suitable means may be employed for mounting the rollers in each train and shifting the axes of rotation of the rollers as above described.

I claim:

1. A power transmission device, which comprises a driving member and a driven member mounted for coaxial rotation and having opposed operating surfaces, an epicyclic train of an odd number of rollers disposed in alignment between the members and having a contacting peripheral friction faces of spherical curvature, the friction faces of the end rollers in the train engaging the operating surfaces of the members respectively adjacent thereto, supports for the individual rollers having pins, on which the rollers are freely rotatable, the supports being movable to cause the individual rollers to be rocked on axes normal to their pins, and means for moving the supports simultaneously to cause all the rollers to be rocked on said axes with alternate rollers in the train rocking in opposite directions.

2. A power transmission device as defined in claim 1, in which the supports for the individual rollers are yokes.

3. A power transmission device as defined in claim 2, in which there are connections between the yokes and means for guiding the connections during the movement of the yokes to rock the rollers.

4. A power transmission device as defined in claim 2, in which there are a pair of spaced pivoted operating arms connected to the yokes and rockable to move the yokes to cause all the rollers to be rocked simultaneously on axes normal to their respective pins with alternate rollers in the train rocking in opposite directions, and means for rocking the arms.

5. A power transmission device as defined in claim 1, which includes a pair of operating arms pivotally mounted on opposite sides of the train of rollers and connected together, a plurality of yokes each encircling a roller and having a pin, on which the roller is freely rotatable, each yoke lying between and being pivotally mounted in the arms for rocking movement on an axis normal to the axis of rotation of its pin, connections between adjacent yokes, at least one of the arms having means for receiving and guiding the connections, and means for swinging the arms to cause the yokes to rock with the yokes of alternate rollers in the train rocking in opposite directions.

6. A power transmission device as defined in claim 5, in which the arms are pivotally mounted to swing on an axis and the yoke of the middle roller in the train is pivoted coaxially with the arms.

7. A power transmission device as defined in claim 1, which includes a supporting structure, on which the driving and driven members are mounted, the members being relatively movable along their common axis, and spring means urging the members together.

8. A power transmission device as defined in claim 1, which includes a plurality of epicyclic trains of an odd number of rollers each, the trains disposed between the members and equiangularly spaced about common axes of the members, the rollers in each train lying in alignment and having contacting peripheral friction faces of spherical curvature with the friction faces of the end rollers in each train engaging the operating surfaces of respective members adjacent thereto, supports for the individual rollers having pins, on which the rollers are freely rotatable, the supports being movable to cause the rollers to be rocked on axes normal to their pins, and means for moving the supports of the rollers of all the trains simultaneously to cause all the rollers with the alternate rollers in each train being rocked in opposite directions.

9. A power transmission device as defined in claim 8, which includes a pair of operating arms mounted on opposite sides of each train, yokes serving as supports for the individual rollers and having pins, on which the rollers are freely rotatable, the yokes for the rollers of a train being pivotally mounted in the arms associated with that train for rocking movement on axes normal to the axes of their pins, the arms for a train being movable to cause the rollers of the train to be rocked with alternate rollers in the train being rocked in opposite directions, and means for moving the arms of all the trains simultaneously.

References Cited in the file of this patent

UNITED STATES PATENTS

| | | |
|---|---|---|
| 1,173,059 | Sundeen | Feb. 22, 1916 |
| 2,100,629 | Chilton | Nov. 30, 1937 |